US009605712B2

(12) United States Patent
Olausson

(10) Patent No.: US 9,605,712 B2
(45) Date of Patent: Mar. 28, 2017

(54) JOURNAL OIL BEARING

(71) Applicant: Siemens Aktiengesellschaft, Munich (DE)

(72) Inventor: Hans-Lennart Olausson, Norrkoping (SE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 14/413,427

(22) PCT Filed: Jul. 24, 2013

(86) PCT No.: PCT/EP2013/065581
§ 371 (c)(1),
(2) Date: Jan. 8, 2015

(87) PCT Pub. No.: WO2014/029579
PCT Pub. Date: Feb. 27, 2014

(65) Prior Publication Data
US 2015/0167736 A1    Jun. 18, 2015

(30) Foreign Application Priority Data

Aug. 21, 2012  (EP) ..................................... 12181196

(51) Int. Cl.
*F16C 33/10* (2006.01)
*F16C 17/03* (2006.01)
(52) U.S. Cl.
CPC ............ *F16C 33/108* (2013.01); *F16C 17/03* (2013.01)

(58) Field of Classification Search
CPC ............................... F16C 33/108; F16C 17/03
See application file for complete search history.

(56) References Cited

U.S. PATENT DOCUMENTS 2,063,570 A * 12/1936  Wallgren ................ F16C 17/03
                                                                    384/312
2,076,254 A *  4/1937  Shebat .................... F16C 17/03
                                                                    384/302
3,022,123 A *  2/1962  Gruber .................... F16C 17/03
                                                                    384/311
(Continued)

FOREIGN PATENT DOCUMENTS

DE          858479 C     12/1952
EP        2345820 A1      7/2011
(Continued)

*Primary Examiner* — Thomas R. Hannon
(74) *Attorney, Agent, or Firm* — Beusse Wolter Sanks & Maire

(57) ABSTRACT

A journal bearing for supporting a rotor shaft extending along a rotor axis having a support element, and at least two pads for supporting the rotor shaft, wherein the pads are supported by the support element is provided herein. The pads may include a bearing surface, wherein the support element and pads include a support for each pad. The support for each pad may include structure to enable tilting for each pad around a tilt axis extending parallel to the rotor axis. The journal bearing may be assigned to a specific default rotation direction of the rotor shaft, wherein tilting of the pad into the rotation direction is positive tilting and tilting of the pad versus the rotation direction is negative tilting.

7 Claims, 2 Drawing Sheets

(56) References Cited

U.S. PATENT DOCUMENTS

| | | | | |
|---|---|---|---|---|
| 3,053,587 A | * | 9/1962 | Wallgren | F16C 17/03 384/312 |
| 3,807,814 A | * | 4/1974 | Stopp | F16C 17/03 384/312 |
| 4,099,799 A | | 7/1978 | Etsion | |
| 4,597,676 A | * | 7/1986 | Vohr | F16C 17/02 384/114 |
| 5,549,392 A | | 8/1996 | Anderson | |
| 5,634,725 A | * | 6/1997 | Chester | F16C 17/03 384/117 |
| 5,743,657 A | | 4/1998 | Stopp | |
| 6,200,034 B1 | * | 3/2001 | Miller | F16C 17/03 384/117 |

FOREIGN PATENT DOCUMENTS

| | | |
|---|---|---|
| EP | 2354820 A1 | 8/2011 |
| GB | 1192354 A | 5/1970 |
| GB | 1505245 A | 3/1978 |

\* cited by examiner

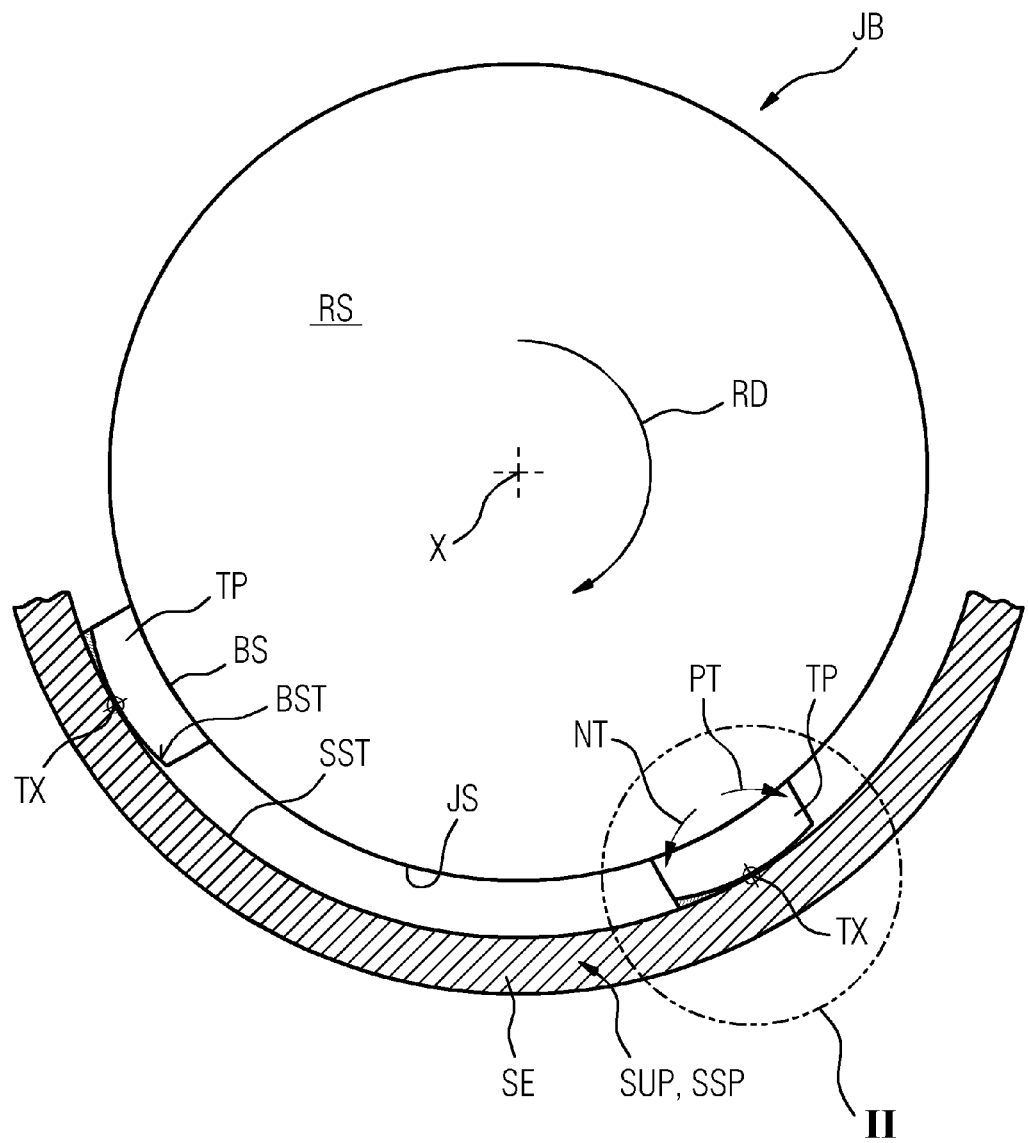

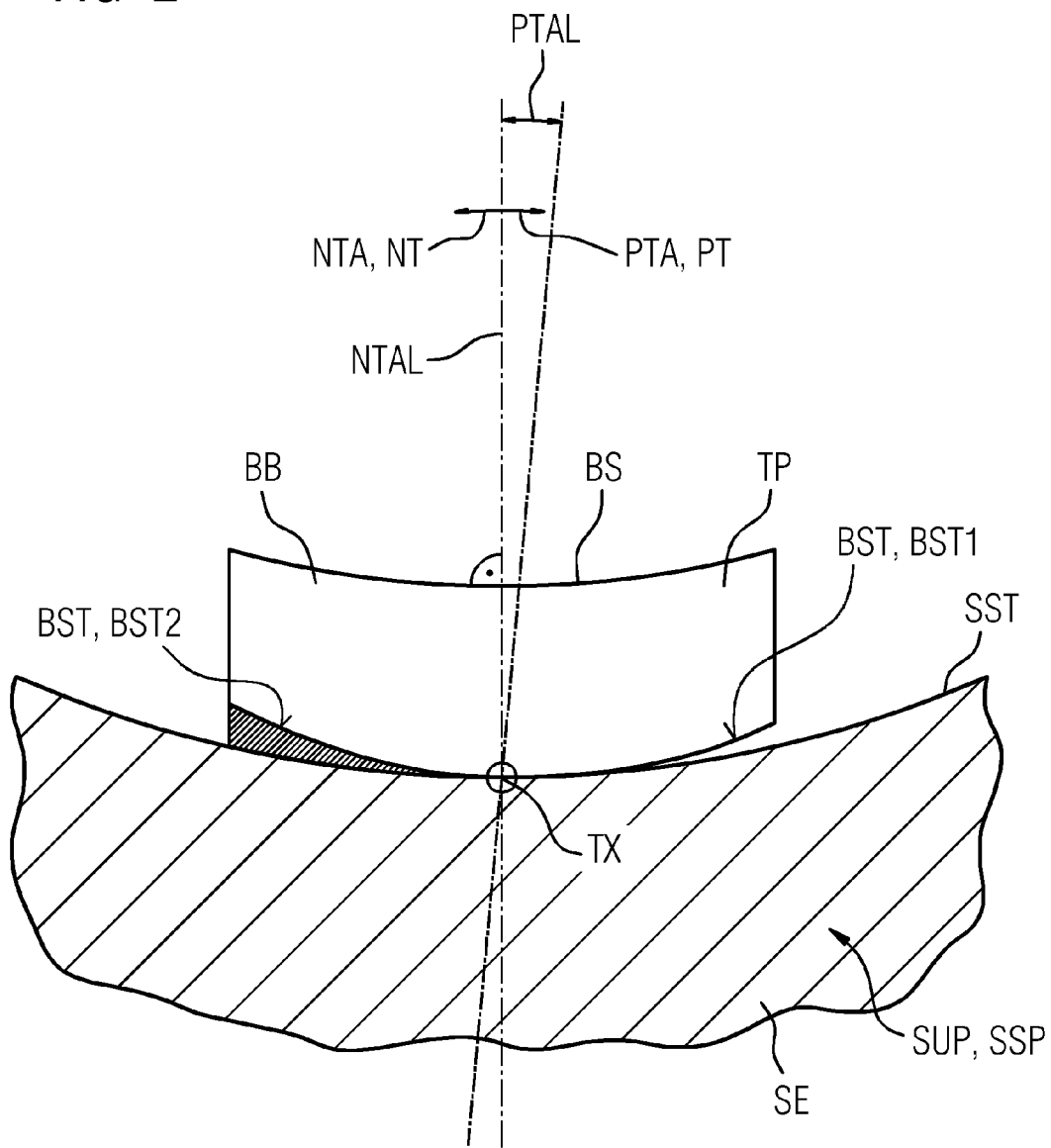

JOURNAL OIL BEARING

CROSS REFERENCE TO RELATED APPLICATIONS

This application is the US National Stage of International Application No. PCT/EP2013/065581 filed Jul. 24, 2013, and claims the benefit thereof. The International Application claims the benefit of European Application No. EP12181196 filed Aug. 21, 2012. All of the applications are incorporated by reference herein in their entirety.

FIELD OF INVENTION

The invention relates to a journal oil bearing to be lubricated by oil for supporting a rotor shaft extending along a rotor axis comprising a support element and at least two pads, wherein the pads are supported by the support element, wherein the pads respectively include a bearing surface, wherein the pads respectively include a backside structure, wherein the support element includes a support structure for each pad, wherein the pad respectively contacts the support element, wherein the backside structure and the support structure are formed such that the pad respectively can tilt around a tilt axis parallel to the rotor axis, wherein the journal bearing is assigned to a specific default rotation direction of the rotor shaft, wherein tilting of the pad respectively into the rotation direction is positive tilting, wherein tilting of the pad versus the rotation direction is negative tilting, wherein the pad is in a neutral tilting angle position during a design speed operation of the rotor shaft, wherein the backside structure and the support structure may be formed such that the positive tilting is enabled and limited from the neutral tilting angle position to a specific positive tilting angle position limit and that the negative tilting may be limited to a certain negative tilting angle limit.

BACKGROUND OF INVENTION

Stationary turbo machines of comparable larger size predominantly use journal bearings of the above mentioned type to support rotor shafts. Stationary turbo machines are for example gas turbines, compressors or steam turbines. One example of a journal bearing according to the above mentioned type is given by EP 2 345 820 A1.

Journal oil bearings as defined incipiently are lubricated by oil and in most cases have an unlimited lifetime if design speed operation is considered. Design speed according to the invention is the speed of the rotor, for which the journal bearing was designed for respectively which speed was assumed in order to design the bearing. During design speed operation the journal surface of the rotor shaft is carried by an oil film and does not directly contact the bearing surface of the bearing. One disadvantage of the journal bearing is the dependency of the oil film on a minimum rotation speed—also considered as the lift-off-speed of the journal bearing. During operation of the journal bearing below the lift-off-speed significant wear occurs. Further the build-up of the oil film is significantly influenced by the surface structure of the bearing surface and its according adjustment to the journal surface. If tolerances of the geometry of the bearing surface don't meet the magnitude of micrometer bearing temperatures can exceed allowable limits, which might endanger safe operation.

In most aero gas turbines this problem is avoided by using ball bearings which need to be overhauled periodically.

To enable an effective build-up of the oil film, which carries the rotor by a certain pressure distribution in the oil film gap between the bearing surface and the journal surface, the pads are designed as tilting pads, enabling a tilting movement around an axis parallel to the rotor axis. An increase in rotation speed normally increases positive tilting of the tilting pad caused by a change in pressure distribution in the oil film. The wearing thickness of the oil film, the wearing angle position of the tilting pads depending on the operation speed leads to the disadvantage of a displacement of the rotor shaft axis with varying operation speed. This radial displacement becomes significantly large during lift-off of the rotor shaft since the oil film is established.

Next to these disadvantages relating to radial displacement by oil film variation another radial displacement mechanism of conventional journal bearings is caused by the tilting movement of the pads. Especially during start-up and run-down involving a standstill the tilting pads cause a shaft sink in the order of several tense of a millimeter respectively micrometer. These shafts think needs to be compensated by additional eccentric clearance between moving parts and stationary parts. The design of radial clearance of a turbo machine is significantly influenced by this shaft sink to avoid radial contact between the rotor and the stator.

SUMMARY OF INVENTION

It is therefore one object of the invention to increase efficiency of turbo machines comprising a journal bearing with tilting pads. It is another object of the invention to reduce a shaft sink during speed variations or standstill of a turbo machine comprising a journal bearing of the incipiently mentioned type.

To solve the problem described above the invention proposes a journal bearing of the incipiently mentioned type with the additional features of the characterizing portion of the independent claim. The dependent claim and the description next to that deal with embodiments of the invention.

According to an embodiment of the invention the above mentioned shaft sink resulting from a tilting movement of the tilting pads is significantly reduced due to a mechanical reduction of the kinematic freedom of the tilting pad to tilt in the direction of negative tilting as defined above. It is to be noted, that the definition of negative and positive tilting related to the rotation direction of the rotor shaft is independent from the axial direction of view onto the shaft rotation. Looking from one of the axial directions of a rotor shaft, which is for example rotating clockwise the positive tilting direction of the respective tilting pad is clockwise as well from the same perspective.

According to an embodiment of the invention the degree of tilting freedom of the tilting pad in a negative direction is at least reduced down to 50% or less of the tilting freedom implemented for the positive tilting direction. One preferred embodiment of the invention restrict this tilting freedom even down to only 10%, which reduces the shaft sink down further and enables additional radial clearance reduction. The most efficiency gain from reduced radial clearance can be obtained if the negative tilting movement is reduced to 0. This would mean that the negative tilting is limited to a negative tilting angle limit of 0% of the positive tilting angle limit. A reasonable tilting angle is approximately between 0.01° and 0.1°. Assuming a realistic tilting pad magnitude of for example 300 mm circumference, this results in a gap difference between the journal surface and the bearing surface measured at the two circumferentially opposing edges of the tilting pad of approximately between 2 micrometer and 100 micrometer.

The tilting of the tilting pads according to an embodiment of the invention can be centered for each pad to respectively one specific tilting axis which is spatially fixed or tilting may be centered to a moving tilting axis always parallel to the rotor axis. Since according to an embodiment of the invention the tilting pad rests and contacts the support structure with its backside surface with a specific line shaped contact area a tilting axis will never be totally spatially fixed but move at least to a certain degree with tilting.

An embodiment provides the support element as ring shaped comprising an inner radius surface as the support structure having a certain radius. At least a part of the backside surface of the tilting pad preferably is circumflexed in a radius, which is smaller than the radius of the support structure. This relation of the radii of the backside surface and the support structure enables a kind of rolling respectively tilting movement of the tilting pad in the support element.

Preferably another circumferential partition, maybe the adjacent circumferential partition of the backside structure has a larger radius than the first partition reducing in coaction with the support structure the degree of tilting. Preferably the backside surface is divided into two different circumferential geometry partitions, while a first partition has a smaller radius than the second partition regarding its circumferential flexation. Here the first partition is the part of the backside structure getting closer to the support structure during positive tilting. The second partition is the part of the backside structure getting closer to the support structure during negative tilting. This specific design limits negative tilting more than positive tilting.

BRIEF DESCRIPTION OF THE DRAWINGS

The above mentioned attributes and other features and advantages of this invention and the manner of attaining them will become more apparent and the invention itself will be better understood by reference to the following description of the currently best mode of carrying out the invention taken in conjunction with the accompanying drawings, wherein:

FIG. 1 shows a schematic cross section view of an arrangement comprising a rotor shaft and a journal bearing according to the invention, FIG. 2 shows a detail according to II indicated in FIG. 1.

DETAILED DESCRIPTION OF INVENTION

FIG. 1 shows a schematic cross section depiction of a journal bearing JB according to an embodiment of the invention together with a rotor shaft RS extending along an axis X of the rotor. The rotor shaft RS rotates in a rotation direction RD. The rotor shaft RS is supported by a journal bearing JB comprising a support element SE and at least two pads TP, which can also be referred to as tilting pads TP.

A pad TP is also schematically shown in an enlarged view in FIG. 2 disclosing further details of geometry and coacting with a support structure SSP.

The rotor shaft RS includes a journal surface JS facing a bearing surface BS of the pad TP. During design speed operation an oil film of certain pressure distribution establishes in a radial gap between the bearing surface and the journal surface supporting the rotor shaft. To establish that oil film—which is not depicted—a certain lift-off-speed of the rotor shaft is necessary.

The pads TP are supported by the support element SE, wherein the support element SE and pads TP include a support SUP for each pad TP, wherein the support SUP for each pad TP includes means to enable tilting for each pad TP around a tilt axis TX extending parallel to said rotor axis RX.

The pads TP, respectively each pad TP, has a basic body BB facing said journal surface with a bearing surface BS on the radially inner side. The pad TP is provided with a backside structure BST of the basic body BB facing a support surface structure of the support element SE. The geometry of the backside structure BST and the support structure SST enable a tilting movement of the pad TP around the tilt axis TX. This tilting movement enables an adjustment of the oil film thickness caused by variations of operating speed.

The journal bearing JB according to an embodiment of the invention is assigned to a specific default rotation direction RD of the rotor shaft RS. The tilting movement of the pad TP is considered to be positive tilting PT if the direction of tilting is the same as the direction of rotor rotation. The contrary tilting movement direction is considered to be negative tilting NT. FIG. 2 shows the backside structure BST being partially hatched. This hatching is meant to illustrate the difference between a conventional backside structure BST and backside structure BST according to the invention. Conventional backside structure BST is basically symmetric with regard to said tilting axis TX. Positive tilting PT has the same positive tilting angle limit PTAL as negative tilting NT. According to the invention a negative tilting angle NTA has a negative tilting angle limit NTAL, which is between 0% and 50% of the positive tilting angle limit PTAL. This asymmetric limitation of tilting of the tilting pad TP reducing negative tilting NT significantly (preferably down to between 0% and 10%, most preferred 0%) and thereby reducing vertical shaft sink. This reduction of shaft sink enables a reduction of radial clearance in a corresponding turbo machine including the rotor shaft RS.

FIG. 2 shows, that the pad TP according to an embodiment of the invention in this includes two different circumferential partitions of the backside structure BST. A first circumferential partition BST1 gets closer to the support structure SST during positive tilting PT and a second partition BST2 of the backside structure BST gets closer to the support structure SST during negative tilting NT. The first partition BST1 is provided with a smaller radius of circumferential flexion than the second partition BST2. This backside structure BST in combination with the support structure SST being basically of one radius enables a negative tilting angle limit being smaller than the positive tilting angle limit of the pad TP. These tilting angle limits (PTAL, NTAL) are basically the limit of tilting the pad TP without putting the pad onto one circumferential edge limiting the back side structure BST. A positive or negative tilting beyond a respective tilting angle limit would only be possible with an increased tilting force, which is a result of ordinary operation. One preferred and in FIG. 2 depicted embodiment of the invention is that the support structure SST in the area of the tilting pad TP has a certain first inner radius of circumferential flexion, which is bigger but not by more than three micrometer of a circumferential flexation radius of the first partition BST1, but is bigger by at least three micrometer of the circumferential flexation radius of the second partition BST2.

The invention claimed is:

1. A journal bearing for supporting a rotor shaft extending along a rotor axis, the journal bearing comprising:
   a support structure surface;
   a pad supporting said rotor shaft, said pad supported by said support structure surface;
   said pad comprising a bearing surface adjacent said rotor shaft and a backside structure surface adjacent said support structure surface; and
   wherein said backside structure surface comprises a radius of curvature smaller than a radius of curvature of said support structure surface such that said backside structure surface contacts said support structure surface along a line shaped contact area defining a tilt axis of the pad;
   wherein a shape of said backside structure surface is not symmetric about said tilt axis.

2. The journal bearing of claim 1, wherein said backside structure surface comprises a first circumferential portion comprising a first radius of curvature on a first side of said tilt axis and a second circumferential portion comprising a second radius of curvature larger than said first radius of curvature on a second side of said tilt axis.

3. The journal bearing of claim 1, wherein said radius of curvature of said support structure surface is bigger than a radius of curvature of said backside structure surface on a first side of said tilt axis by not more than 3 mm, and said radius of curvature of said support structure surface is bigger than a radius of curvature of said backside structure surface on a second side of said tilt axis by at least 3 mm.

4. A journal bearing for supporting a rotor shaft extending along a rotor axis, the journal bearing comprising:
   a support structure surface;
   a pad supporting said rotor shaft, said pad supported by said support structure surface;
   said pad comprising a bearing surface adjacent said rotor shaft and a backside structure surface adjacent said support structure surface; and
   wherein said backside structure surface comprises a radius of curvature smaller than a radius of curvature of said support structure surface such that said backside structure surface contacts said support structure surface along a line shaped contact area defining a tilt axis of the pad;
   further comprising:
   wherein tilting of said pad about said tilt axis into a rotation direction of the rotor shaft is positive tilting, and tilting of said pad about said tilt axis versus said rotation direction is negative tilting;
   wherein said pad is in a neutral tilting position during a design speed operation of said rotor shaft;
   wherein said backside structure surface is shaped such that said positive tilting is enabled and limited from said neutral tilting position to a positive tilting angle limit and that said negative tilting is enabled and limited from said neutral tilting position to a negative tilting angle limit; and
   wherein said negative tilting angle limit is 50% or less of said positive tilting angle limit.

5. The journal bearing of claim 4, wherein said negative tilting angle limit is 10% or less of said positive tilting angle limit.

6. A journal bearing for supporting a rotor shaft extending along a rotor axis, the journal bearing comprising:
   a support structure surface;
   a pad supporting said rotor shaft, said pad supported by said support structure surface;
   said pad comprising a bearing surface adjacent said rotor shaft and a backside structure surface adjacent said support structure surface;
   wherein tilting of said pad about a tilt axis parallel to the rotor axis into a rotation direction of the rotor shaft is a positive tilting direction, and tilting of said pad about said tilt axis versus said rotation direction is a negative tilting direction; and
   wherein said backside structure surface comprises a shape effective to limit shaft sink by limiting a kinematic freedom of said pad to tilt in said negative tilting direction to be less than a kinematic freedom of said pad to tilt in said positive tilting direction.

7. The journal bearing of claim 6, wherein said backside structure surface contacts said support structure surface along a line shaped contact area defining said tilt axis; and
   a radius of curvature of said backside structure surface on a first side of said tilt axis is less than a radius of curvature of said backside structure surface on a second side of said tilt axis as viewed parallel to the tilt axis.

* * * * *